United States Patent
Menachem et al.

(10) Patent No.: US 10,248,610 B2
(45) Date of Patent: Apr. 2, 2019

(54) ENFORCING TRANSACTION ORDER IN PEER-TO-PEER INTERACTIONS

(71) Applicant: Mellanox Technologies Ltd., Yokneam (IL)

(72) Inventors: Adi Menachem, Hod Hasharon (IL); Shachar Raindel, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 262 days.

(21) Appl. No.: 15/177,348

(22) Filed: Jun. 9, 2016

(65) Prior Publication Data

US 2016/0378709 A1 Dec. 29, 2016

Related U.S. Application Data

(60) Provisional application No. 62/183,213, filed on Jun. 23, 2015.

(51) Int. Cl.

| G06F 13/42 | (2006.01) |
|---|---|
| G06F 11/30 | (2006.01) |
| G06F 13/28 | (2006.01) |
| G06F 11/32 | (2006.01) |
| G06F 15/173 | (2006.01) |

(52) U.S. Cl.
CPC ...... *G06F 13/4282* (2013.01); *G06F 11/3024* (2013.01); *G06F 11/3027* (2013.01); *G06F 11/3041* (2013.01); *G06F 11/327* (2013.01); *G06F 13/28* (2013.01); *G06F 15/17331* (2013.01)

(58) Field of Classification Search
None
See application file for complete search history.

(56) References Cited

U.S. PATENT DOCUMENTS

| 4,680,703 A | 7/1987 | Kriz |
|---|---|---|
| 5,913,226 A | 6/1999 | Sato |
| 6,490,647 B1 | 12/2002 | Batchelor et al. |
| 7,721,049 B2 | 5/2010 | Ehrlich et al. |
| 7,886,182 B1 * | 2/2011 | Coatney ............ G06F 11/2028 714/11 |

(Continued)

OTHER PUBLICATIONS

PCI Express® Base Specification,Revision 3.0, 860pages, Nov. 10, 2010.

(Continued)

*Primary Examiner* — Michael Sun
(74) *Attorney, Agent, or Firm* — Kligler & Associates

(57) ABSTRACT

A method for computing includes submitting a first command from a central processing unit (CPU) to a first peripheral device in a computer to write data in a first bus transaction over a peripheral component bus in the computer to a second peripheral device in the computer. A second command is submitted from the CPU to one of the first and second peripheral devices to execute a second bus transaction, subsequent to the first bus transaction, that will flush the data from the peripheral component bus to the second peripheral device. The first and second bus transactions are executed in response to the first and second commands. Following completion of the second bus transaction, the second peripheral device processes the written data in.

20 Claims, 4 Drawing Sheets

(56) References Cited

U.S. PATENT DOCUMENTS

| | | | |
|---|---|---|---|
| 8,874,680 B1* | 10/2014 | Das | H04L 67/1095 709/212 |
| 9,104,582 B1 | 8/2015 | Mukundan | |
| 9,525,734 B2* | 12/2016 | Izenberg | H04L 67/1097 |
| 9,645,931 B2 | 5/2017 | Cox et al. | |
| 9,645,932 B1 | 5/2017 | Bono et al. | |
| 9,678,871 B2 | 6/2017 | Voigt | |
| 2006/0179195 A1 | 8/2006 | Sharma et al. | |
| 2006/0256784 A1 | 11/2006 | Feng et al. | |
| 2006/0259661 A1 | 11/2006 | Feng et al. | |
| 2008/0256183 A1* | 10/2008 | Flynn | G06F 3/0613 709/204 |
| 2009/0300660 A1 | 12/2009 | Solomon et al. | |
| 2010/0205367 A1 | 8/2010 | Ehrlich et al. | |
| 2011/0153952 A1 | 6/2011 | Dixon et al. | |
| 2013/0198311 A1* | 8/2013 | Tamir | G06F 15/167 709/212 |
| 2014/0195480 A1* | 7/2014 | Talagala | G06F 12/0804 707/610 |
| 2014/0258637 A1 | 9/2014 | Hong et al. | |
| 2015/0019903 A1 | 1/2015 | Arroyo et al. | |
| 2015/0026368 A1* | 1/2015 | Kagan | G06F 13/28 710/22 |
| 2015/0067091 A1 | 3/2015 | Das | |
| 2015/0347349 A1 | 3/2015 | Raindel et al. | |
| 2015/0293881 A1* | 10/2015 | Raikin | G06F 12/1072 709/212 |
| 2016/0124877 A1 | 5/2016 | Hefty et al. | |
| 2017/0034268 A1 | 2/2017 | Govind | |

OTHER PUBLICATIONS

NVIDIA Corporation, "NVIDIA GPUDirect", 4 pages, year 2015.
Menachem et al., U.S. Appl. No. 15/202,590, filed Jul. 6, 2016.
U.S. Appl. No. 15/058,262 Office Action dated Jun. 2, 2017.
European Application # 17156357.0 Search Report dated Jul. 6, 2017.
U.S. Appl. No. 15/058,262 office action dated Sep. 29, 2017.
U.S. Appl. No. 15/202,590 office action dated Oct. 1, 2018.

\* cited by examiner

ENFORCING TRANSACTION ORDER IN PEER-TO-PEER INTERACTIONS

CROSS-REFERENCE TO RELATED APPLICATION

This application claims the benefit of U.S. Provisional Patent Application 62/183,213, filed Jun. 23, 2015, which is incorporated herein by reference.

FIELD OF THE INVENTION

The present invention relates generally to computer systems, and particularly to peer-to-peer interactions over a peripheral component bus in a computer.

BACKGROUND

In many computer systems, peripheral devices communicate with the central processing unit (CPU) and with one another over a peripheral component bus, such as the PCI-Express® (PCIe®) bus. Such peripheral devices may include, for example, a solid state drive (SSD), a network interface controller (NIC), and various accelerator modules, such as a graphics processing unit (GPU).

Methods for directly accessing the local memory of a peripheral device via PCIe and other peripheral component buses are known in the art. For example, U.S. Patent Application Publication 2015/0347349, which is assigned to the assignee of the present patent application and whose disclosure is incorporated herein by reference, describes a method for communicating between at least first and second devices over a bus in accordance with a bus address space, including providing direct access over the bus to a local address space of the first device by mapping at least some of the addresses of the local address space to the bus address space. The term "direct access" means that data can be transferred between devices, over the bus, with no involvement of the software running on the CPU in the data plane.

As another example, GPUDirect RDMA is an application program interface (API) that supports interaction between an InfiniBand™ NIC (referred to as a host channel adapter, or HCA) and peer memory clients, such as GPUs. It is distributed by Mellanox Technologies Ltd. (Yokneam, Israel). This API provides a direct P2P (peer-to-peer) data path between the GPU memory and Mellanox HCA devices. It enables the HCA to read and write peer memory data buffers, and thus allows RDMA-based applications to use the computing power of the peer device without the need to copy data to host memory.

Transactions on the PCIe bus fall into two general classes: posted and non-posted, as defined in section 2.4.1 (pages 122-123) of the PCI Express Base Specification (Rev. 3.0, referred to hereinbelow simply as the "PCIe specification"). In non-posted transactions, the device that initiates the transaction (referred to as the "requester") expects to receive a completion Transaction Layer Packet (TLP) from the device completing the request, thus confirming that the completer received the request. Read requests are an example of non-posted transactions. In posted transactions, the requester does not expect to and will not receive a completion TLP. Write requests are an example of posted transactions, and thus the requester will generally not know when or even whether the write transaction was successfully completed.

Because PCIe transactions rely on transmission and reception of packets over a bus fabric, it can sometimes occur that when two transactions are directed to the same device, the transaction that was requested later will be the first one to reach the device. The PCIe specification imposes certain rules on the ordering of transmission of TLPs by switches on the bus, for example that non-posted transactions (such as read requests) must not pass posted transactions (such as write requests). On the other hand, some PCIe devices and applications use "relaxed ordering" for enhanced performance. When the relaxed ordering attribute bit is set in a TLP (as defined in section 2.2.6.4 of the PCIe specification, page 75), switches on the PCIe bus are not required to observe strong write ordering with respect to this TLP, and write transactions can thus be forwarded and executed out of order. Relaxed ordering allows the host bridge to transfer data to and from memory more efficiently and may result in better direct memory access (DMA) performance.

SUMMARY

Embodiments of the present invention that are described hereinbelow provide improved methods for data transfer between peripheral devices in a computer, as well as devices and systems that implement such methods.

There is therefore provided, in accordance with an embodiment of the invention, a method for computing, which includes submitting a first command from a central processing unit (CPU) to a first peripheral device in a computer to write data in a first bus transaction over a peripheral component bus in the computer to a second peripheral device in the computer. A second command is submitted from the CPU to one of the first and second peripheral devices to execute a second bus transaction, subsequent to the first bus transaction, that will flush the data from the peripheral component bus to the second peripheral device. The first and second bus transactions are executed in response to the first and second commands. Following completion of the second bus transaction, the written data are processed in the second peripheral device.

In a disclosed embodiment, the method includes submitting, after executing the first bus transaction, a completion notification from the first peripheral device to the CPU, wherein the CPU submits the second command in response to the completion notification.

Additionally or alternatively, submitting the second command includes instructing the first peripheral device to transmit an instruction over the bus to the second peripheral device to process the written data, and executing the second bus transaction both flushes the data and causes the second peripheral device to execute the instruction and process the written data.

Further alternatively, submitting the second command includes instructing the second peripheral device to execute the second bus transaction and, after completion of the second bus transaction, to process the written data.

In another embodiment, submitting the second command includes instructing the first peripheral device to execute the second bus transaction, and the method includes, after executing the second bus transaction, submitting a completion notification from the first peripheral device to the CPU, wherein the CPU instructs the second peripheral device to process the written data in response to the completion notification.

In some embodiments, executing the first bus transaction includes writing the data to a memory of the second peripheral device in a posted write operation by direct memory access (DMA) over the bus. Additionally or alternatively, executing the second bus transaction includes executing, by the one of the first and second peripheral devices to which the second command was submitted, a read transaction directed over the bus to the other of the first and second peripheral devices.

In some embodiments, the first peripheral device is a network interface controller (NIC), which couples the computer to a packet data network, and executing the first bus transaction includes receiving the data at the NIC over the network in a remote direct memory access (RDMA) operation and writing the received data to the second peripheral device. In one embodiment receiving the data includes receiving one or more RDMA packets over the network from a server, wherein the RDMA operation is initiated by a host processor in the server. Additionally or alternatively, submitting the second command includes instructing the NIC to transmit a data packet to a network address that is associated with the second peripheral device. In a disclosed embodiment, the second peripheral device is a graphics processing unit (GPU).

There is also provided, in accordance with an embodiment of the invention, computing apparatus, including a first peripheral device, a second peripheral device, and peripheral component bus that interconnects at least the first and second peripheral devices. A central processing unit (CPU) is configured to a submit a first command to the first peripheral device to write data in a first bus transaction over the peripheral component bus to the second peripheral device, and to submit a second command to one of the first and second peripheral devices to execute a second bus transaction, subsequent to the first bus transaction, that will flush the data from the peripheral component bus to the second peripheral device, and to cause the second peripheral device to process the written data after execution of the first and second bus transactions, in response to the first and second commands, has been completed.

The present invention will be more fully understood from the following detailed description of the embodiments thereof, taken together with the drawings in which:

DETAILED DESCRIPTION OF EMBODIMENTS

Figure 1:
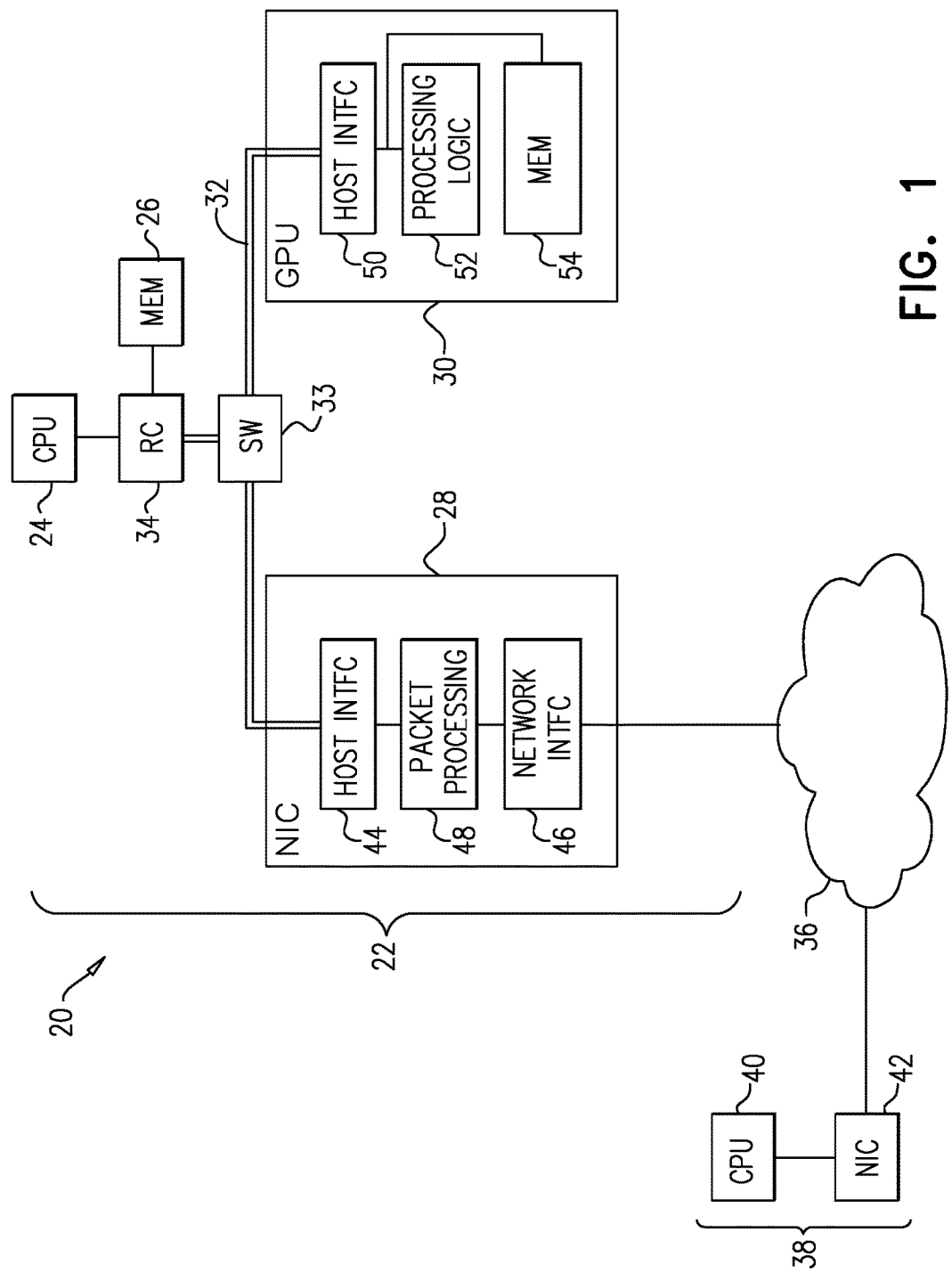
FIG. 1 is block diagram that schematically illustrates a computer system, in accordance with an embodiment of the invention.

Technologies such as the above-mentioned GPUDirect enable direct communication between peripheral devices on a computer bus using PCIe peer-to-peer transactions. In many applications, however, even when data are transferred directly between a pair of peripheral devices, another device, such as the host central processing unit (CPU), is still responsible for the control plane. For example, even after a first peripheral device, such as a NIC, has written data by peer-to-peer DMA to the memory of a second peripheral device, such as a GPU, the CPU must still verify that the peer-to-peer transaction has been completed before instructing the GPU to process the data. When the data are transferred by posted write over the PCIe bus, the NIC will report completion of the transaction to the CPU after posting the write transaction, without any guarantee as to when the data will actually reach the GPU. The CPU and NIC typically communicate with the GPU over different paths through the PCIe bus network, so that there is also no guarantee that an instruction sent by the CPU to the GPU after receiving the completion report from the NIC will not reach the GPU before the GPU has received all of the DMA data from the NIC.

The naïve solution to this problem is simply for the CPU to wait after receiving the completion report from the NIC for a long enough period before sending the instruction to the GPU, in order to ensure with high probability that the write transaction has been completed. Other possible solutions include directing the data path through the CPU, or for the CPU to poll the GPU for arrival of the data before issuing the instructions. All of these options can cause undesirable delays and overheads. These problems (and the solutions described herein) apply not only to data transfer between a NIC and a GPU, but also to peer-to-peer transactions between other sorts of peripheral devices, whether carried out over PCIe or other peripheral component buses that are known in the art.

In the embodiments that are described herein, the CPU interacts over a peripheral component bus with first and second peripheral devices, such as a NIC and a GPU, by issuing two commands: The first command instructs the first peripheral device to write data over the bus in a first bus transaction (typically a DMA transaction) to the second peripheral device. The second command instructs either the first or the second peripheral device to execute a second bus transaction, subsequent to the first transaction, that will flush the data from the peripheral component bus to the second peripheral device. After completion of the second bus transaction, the second peripheral device can then process the data in its memory with full confidence in the integrity of the data. Executing the first and second bus transactions in this manner, in order, in response to the commands from the CPU, ensures that the data transfer to the second peripheral device has been completed without requiring the CPU to wait, poll, or otherwise intervene in the data plane.

In the disclosed embodiments of the present invention, the second bus transaction can take various forms. For example, in one embodiment, the second command from the CPU instructs the first peripheral device to transmit an instruction over the bus to the second peripheral device to process the written data. Executing the second bus transaction will then both flush the data and cause the second peripheral device to execute the instruction and process the written data.

In another embodiment, the second command instructs the first peripheral device to execute another sort of bus transaction that will flush the bus, such as a (non-posted) read transaction. After executing this second bus transaction, the first peripheral device submits a completion notification to the CPU, whereupon the CPU instructs the second peripheral device to process the data written in the first bus transaction.

In yet another embodiment, the second command instructs the second peripheral device to execute the second bus transaction and, after completion of the second bus transaction, to process the written data.

In some embodiments, the CPU is a part of the same host computer as the first and second peripheral devices and interacts with the peripheral devices locally over the bus in the computer. In other embodiments, however, in which the first peripheral device is a NIC connected to a packet data network, the commands may be issued by the host processor (CPU) of a remote server over the network. In such an embodiment, the first bus transaction can involve receiving the data at the NIC over the network in a remote direct memory access (RDMA) operation initiated by the remote server, and writing the received data from the NIC to the second peripheral device. The remote server can then transmit a subsequent packet over the network that will cause the NIC to flush the bus and initiate the data processing operation by the second peripheral device.

FIG. 1 is a block diagram that schematically illustrates a computer system 20, in accordance with an embodiment of the invention. System 20 comprises computing apparatus in the form of a host computer 22, comprising a CPU 24 and a system memory 26, as well as peripheral devices including a NIC 28 and a GPU 30. As noted earlier, however, the NIC and GPU are shown only as examples of peripheral devices that can take part in the methods described herein, and in alternative embodiments (not shown in the figures), computer 22 may comprise peripheral devices of other types that interact in this manner. CPU 24, NIC 28 and GPU 30 exchange data and commands over a peripheral component bus 32, such as a PCIe bus. In the pictured example, bus 32 comprises several links connected by one or more switches 33, while CPU 24 and memory 26 are connected to the bus by a root complex 34, as defined by the PCIe specification.

NIC 28 links computer 22 to a packet network 36, such as an InfiniBand network or a Converged Ethernet network that offers RDMA support. Computer 22 communicates over network 36 with other computers, such as a server 38, comprising a host processor (CPU) 40 and a NIC 42, which links server 38 to the network. NIC 28 comprises a host interface 44, which connects to bus 32, and a network interface 46, which connects to network 36. Packet processing circuitry 48 in NIC 28 receives packets from network 36 via network interface 46 and accordingly initiates transactions on bus 32 via host interface 44. Circuitry 48 likewise generates packets for transmission to network 36 in response to commands and other transactions directed to host interface 44 over bus 32.

GPU 30 similarly comprises a host interface 50 connected to bus 32. Host interface 50, like host interface 44, exposes a predefined address range on bus 32, which enables NIC 28 and GPU 30 to exchange data over the bus in peer-to-peer DMA transactions. GPU 30 stores such data in a local memory 54. Processing logic 52 processes the data in memory 54, in response to commands received via host interface 32, and writes the processed data to memory 54 or to other addresses on bus 32. In the case of GPU 30, logic 52 performs highly-parallelized algebraic processing tasks, but other types of accelerators may perform computations of other sorts. Alternatively or additionally, the principles of the present invention may be applied to transfer of data and processing of the data by other sorts of peripheral devices, including storage and input/output (I/O) devices.

Figure 2:
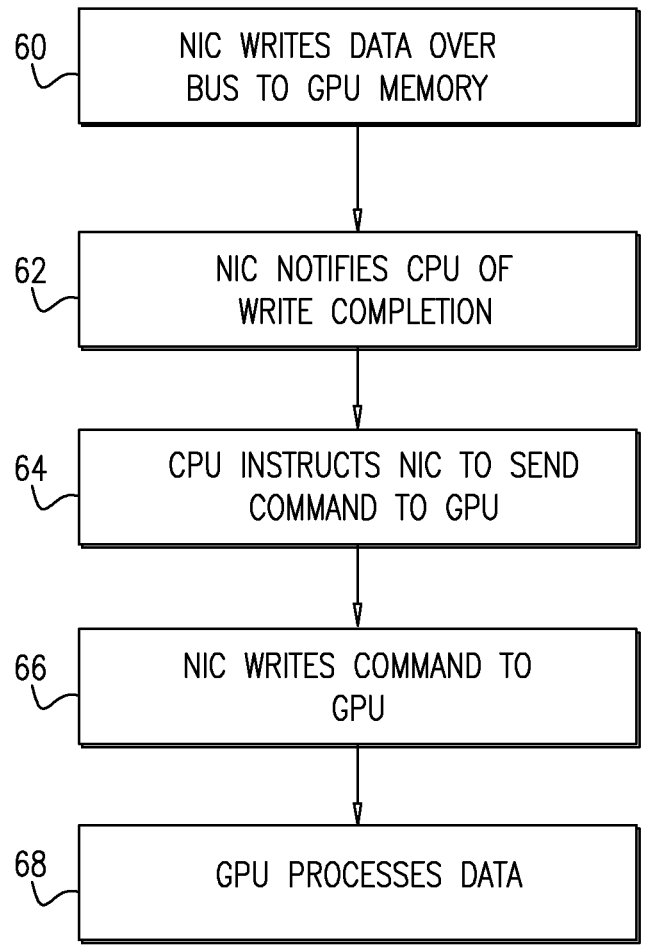
FIGS. 2-4 are flow charts that schematically illustrate methods for transferring data between peripheral devices, in accordance with an embodiment of the invention.
Figure 3:
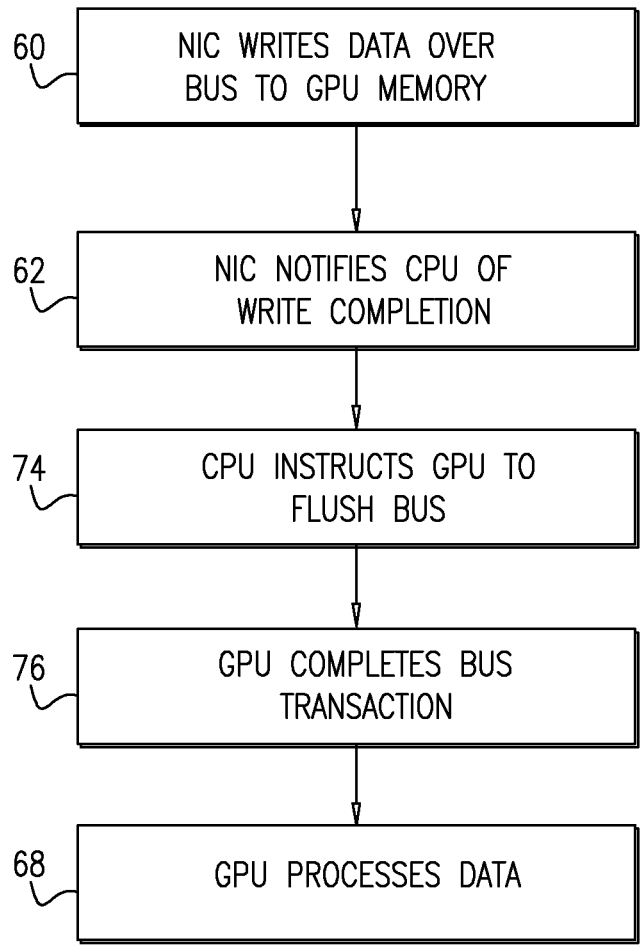
Figure 4:
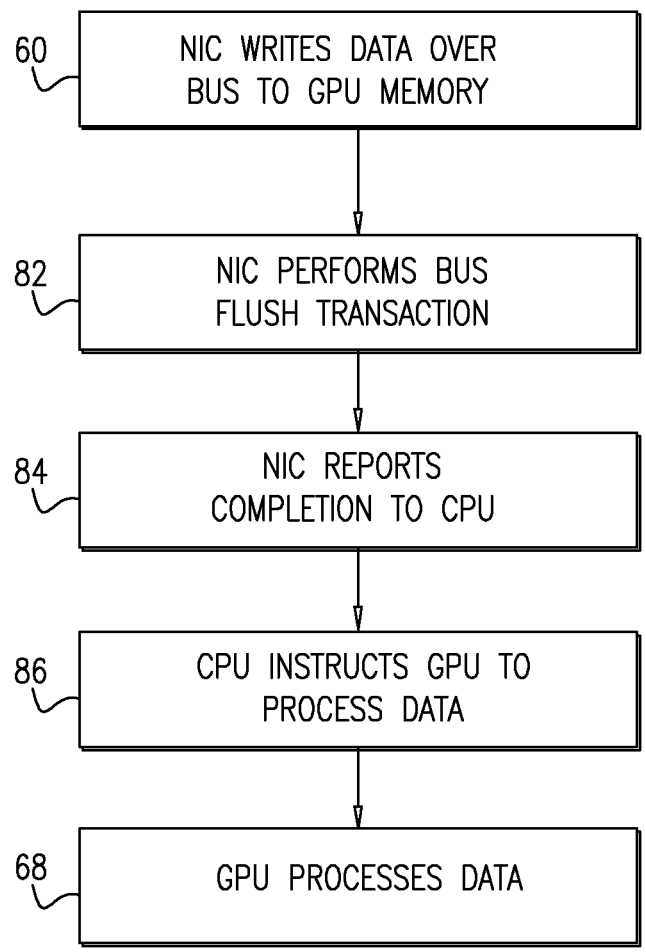

FIG. 2 is a flow chart that schematically illustrates a method for transferring data between peripheral devices, in accordance with an embodiment of the invention. For the sake of clarity and concreteness, this method, as well as the methods of FIGS. 3 and 4, is described with reference to the specific components of system 20. As noted earlier, however, the principles of these methods are similarly applicable, mutatis mutandis, to interactions between peripheral devices of other types.

To initiate the method of FIG. 2, NIC 28 receives a command, for example from CPU 24, to transfer data over bus 32 to GPU 30, and writes the data in a posted write operation by DMA to the GPU, in a data writing step 60. For example, CPU 24 may issue an RDMA read command to NIC 28 to retrieve the data from a specified address on network 36 and to write the data to an address in memory 54 of GPU 30. (Alternatively, as described below, the command may come in the form of an RDMA operation initiated by CPU 40 in server 38, so that the command to NIC 28 is effectively issued by CPU 40, without involvement of CPU 24. This mode of operation is described further hereinbelow.) Upon reaching GPU 30, the data are saved in memory 54.

After posting the write transaction to GPU 30, NIC 28 submits a completion notification to CPU 24, for example by posting a suitable write transaction over bus 32, at a completion reporting step 62. (NIC 28 does not receive a notification that the write transaction was completed, but rather issues the completion notification as soon as the write transaction has been posted.) After receiving this notification, CPU 24 submits a further command to NIC 28, for delivery to GPU 30, at a command submission step 64. In response to the command from CPU 24, NIC 28 performs a further write transaction to deliver the command over bus 32 to GPU 30, at a command writing step 66. Because the transaction of step 66 is directed over the same path through bus 32 to the same destination (GPU 30) as the data written at step 60, bus 32 can guarantee that the command will not reach the GPU before the data. Upon receiving the command sent at step 66, GPU 30 processes the data in memory 54, at a data processing step 68. The processing results are then returned to CPU 24 or to another entity that is to receive the processed data.

In one embodiment, for the purposes of step 64, CPU 24 commands NIC 28 to transmit a data packet to a network address that is associated with GPU 30, with the instruction to the GPU encapsulated in the payload of the packet. This sort of address differentiation is possible in particular when NIC 28 supports network virtualization, so that the NIC can expose multiple addresses, including the address of GPU 30. Alternatively, network interface may comprise multiple physical ports with different addresses, one of which is assigned to GPU 30. In either case, in response to the command from CPU 24 at step 64, NIC 28 will not transmit the packet to network 36. Rather, the packet will be looped back through packet processing circuitry 48 as though it had arrived from network 36, and NIC 28 will then deliver the payload, i.e., the processing command, to GPU 30.

In another embodiment, NIC 28 receives the data at step 60 in packets transmitted over network 36 by NIC 42 of server 38 in an RDMA write operation initiated by CPU 40. The write operation is directed to an address in the address space of GPU 30 on bus 32, and NIC 28 thus writes the received data over the bus by DMA to the specified address in memory 54 of GPU 30. NIC 28 sends an acknowledgment to NIC 42, indicating that the RDMA write operation has been completed, thus causing NIC 42 to deliver a completion report to CPU 40 at step 62. CPU 40 then initiates another RDMA write operation at step 64, to write the processing command to GPU 30. Upon receiving this RDMA write packet, NIC 28 delivers the processing command to the GPU at step 66.

FIG. 3 is a flow chart that schematically illustrates a method for transferring data between peripheral devices, in accordance with another embodiment of the invention. This method, as well as the method of FIG. 4, shares certain elements with the method of FIG. 2 that is described above. These elements are identified in the flow charts and in the description by the same numbers as were used in FIG. 2.

The method of FIG. 3 begins with NIC 28 writing data over bus 32 to memory 54 of GPU 30 at step 60, followed by notification to CPU 24 that the write transaction has been posted at step 62. In the present embodiment, however, CPU 24 next issues a command to GPU 30, at a GPU command step 74. This command instructs GPU 30 to perform two actions in sequence: first to execute a transaction that will flush the data written at step 60 from bus 32 to memory 54, and second, after completion of this bus transaction, to process the written data. The flushing transaction can be a (non-posted) read transaction, possibly a zero-length read, directed by GPU 30 to a bus address associated with NIC 28. Alternatively, the flushing transaction may be an RDMA read operation to be carried out by NIC 28.

GPU 30 completes the flushing transaction on bus 32, at a flush completion step 76. This transaction ensures that all required data have been written to memory 54. The GPU can then proceed to process the data at step 68.

FIG. 4 is a flow chart that schematically illustrates a method for transferring data between peripheral devices, in accordance with yet another embodiment of the invention. In this embodiment, CPU 24 (or possible CPU 40 of remote server 38) issues two commands to NIC 28: first to write data over bus 32 to GPU 30, and second to perform a transaction that will flush the written data from the bus to memory 54 of GPU 30. In contrast to the method of FIG. 2, the CPU in this case does not wait to receive a completion report from NIC 28 before instructing the NIC to flush the bus, but rather instructs the NIC to carry out the data transfer and flush transactions sequentially, for example, by posting the data transfer and flush commands one after the other in the same instruction queue. NIC 28 completes these operations without further involvement by CPU 24.

NIC 28 transfers the data to GPU 30 at step 60 in response to the first command, and then performs a bus flush transaction in response to the second command, at a NIC flushing step 82. The flush transaction can comprise, for example, a (non-posted) read transaction directed by NIC 28 to a bus address of GPU 30. NIC 28 receives notification from bus 32 that this flush transaction has been completed, and submits a completion notification to CPU 24 (or an acknowledgment packet to server 38), at a completion reporting step 84.

Upon receiving this completion notification, CPU 24 instructs GPU 30 to process the data in memory 54, at a processing instruction step 86. (Alternatively, again, the processing instruction at step 86 may come by RDMA write from CPU 40.) The GPU then processes the data as instructed, at step 68.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
receiving in a network interface controller (NIC), which is configured as a first peripheral device in a computer and couples the computer to a packet data network, data transmitted over the network in a remote direct memory access (RDMA) operation;
writing the data in a first bus transaction over a peripheral component bus in the computer from the NIC to a second peripheral device in the computer;
after executing the first bus transaction, submitting a completion notification from the NIC to a central processing unit (CPU);
in response to the completion notification, submitting a command from the CPU to one of the first and second peripheral devices to execute a second bus transaction, subsequent to the first bus transaction, that will flush the data from the peripheral component bus to the second peripheral device;
executing the second bus transaction in response to the command; and
following completion of the second bus transaction, processing the written data in the second peripheral device.

2. The method according to claim 1, wherein submitting the command comprises instructing the first peripheral device to transmit an instruction over the bus to the second peripheral device to process the written data, and wherein executing the second bus transaction both flushes the data and causes the second peripheral device to execute the instruction and process the written data.

3. The method according to claim 1, wherein submitting the command comprises instructing the second peripheral device to execute the second bus transaction and, after completion of the second bus transaction, to process the written data.

4. The method according to claim 1, wherein submitting the command comprises instructing the first peripheral device to execute the second bus transaction, and wherein the method comprises, after executing the second bus transaction, submitting a completion notification from the first peripheral device to the CPU, wherein the CPU instructs the second peripheral device to process the written data in response to the completion notification.

5. The method according to claim 1, wherein executing the first bus transaction comprises writing the data to a memory of the second peripheral device in a posted write operation by direct memory access (DMA) over the bus.

6. The method according to claim 1, wherein executing the second bus transaction comprises executing, by the one of the first and second peripheral devices to which the command was submitted, a read transaction directed over the bus to the other of the first and second peripheral devices.

7. The method according to claim 1, wherein receiving the data comprises receiving one or more RDMA packets over the network from a server, wherein the RDMA operation is initiated by a host processor in the server.

8. The method according to claim 1, wherein submitting the command comprises instructing the NIC to transmit a data packet to a network address that is associated with the second peripheral device.

9. The method according to claim 1, wherein the second peripheral device comprises a solid state drive (SSD).

10. A method for computing, comprising:
submitting a first command from a central processing unit (CPU) to a first peripheral device in a computer to write data in a first bus transaction over a peripheral component bus in the computer to a second peripheral device in the computer;
submitting a second command from the CPU to one of the first and second peripheral devices to execute a second bus transaction, subsequent to the first bus transaction, that will flush the data from the peripheral component bus to the second peripheral device;
executing the first and second bus transactions in response to the first and second commands; and
following completion of the second bus transaction, processing the written data in the second peripheral device
wherein the first peripheral device is a network interface controller (NIC), which couples the computer to a packet data network, and wherein executing the first bus transaction comprises receiving the data at the NIC over the network in a remote direct memory access (RDMA) operation and writing the received data to the second peripheral device, and wherein the second peripheral device is a graphics processing unit (GPU).

11. A computing apparatus, comprising:

a network interface controller (NIC), which is configured as a first peripheral device and couples the apparatus to a packet data network;

a second peripheral device;

a peripheral component bus that interconnects at least the first and second peripheral devices; and a central processing unit (CPU), wherein the NIC is configured to receive data transmitted over the network in a remote direct memory access (RDMA) operation, to write the data in a first bus transaction over the peripheral component bus from the NIC to the second peripheral device, and after executing the first bus transaction, submitting a completion notification from the NIC to the CPU, and wherein the CPU is configured, in response to the completion notification, to submit a command to one of the first and second peripheral devices to execute a second bus transaction, subsequent to the first bus transaction, that will flush the data from the peripheral component bus to the second peripheral device, and to cause the second peripheral device to process the written data after execution of the first and second bus transactions has been completed.

12. The apparatus according to claim 11, wherein the command instructs the first peripheral device to transmit an instruction over the bus to the second peripheral device to process the written data, and wherein executing the second bus transaction both flushes the data and causes the second peripheral device to execute the instruction and process the written data.

13. The apparatus according to claim 11, wherein the command instructs the second peripheral device to execute the second bus transaction and, after completion of the second bus transaction, to process the written data.

14. The apparatus according to claim 11, wherein the command instructs the first peripheral device to execute the second bus transaction, and wherein the first peripheral device is configured to submit, after executing the second bus transaction, a completion notification to the CPU, wherein the CPU instructs the second peripheral device to process the written data in response to the completion notification.

15. The apparatus according to claim 11, wherein the first bus transaction comprises writing the data to a memory of the second peripheral device in a posted write operation by direct memory access (DMA) over the bus.

16. The apparatus according to claim 11, wherein the second bus transaction comprises a read transaction by the one of the first and second peripheral devices to which the command was submitted, directed over the bus to the other of the first and second peripheral devices.

17. The apparatus according to claim 11, wherein the NIC is configured to receive the data in one or more RDMA packets over the network from a server, wherein the RDMA operation is initiated by a host processor in the server.

18. The apparatus according to claim 11, wherein the command instructs the NIC to transmit a data packet to a network address that is associated with the second peripheral device.

19. The apparatus according to claim 11, wherein the second peripheral device comprises a solid state drive (SSD).

20. A computing apparatus, comprising:

a first peripheral device;

a second peripheral device;

a peripheral component bus that interconnects at least the first and second peripheral devices; and a central processing unit (CPU), which is configured to a submit a first command to the first peripheral device to write data in a first bus transaction over the peripheral component bus to the second peripheral device, and to submit a second command to one of the first and second peripheral devices to execute a second bus transaction, subsequent to the first bus transaction, that will flush the data from the peripheral component bus to the second peripheral device, and to cause the second peripheral device to process the written data after execution of the first and second bus transactions, in response to the first and second commands, has been completed, wherein the first peripheral device is a network interface controller (NIC), which couples the computer to a packet data network, and wherein the NIC is configured to receive the data over the network in a remote direct memory access (RDMA) operation and to write the received data to the second peripheral device in the first bus transaction, and wherein the second peripheral device is a graphics processing unit (GPU).

* * * * *